United States Patent [19]

Otani et al.

[11] 4,085,194

[45] Apr. 18, 1978

[54] WASTE FLUE GAS DESULFURIZING METHOD

[75] Inventors: Kouji Otani; Toshio Sawa; Osamu Kuroda; Fumito Nakajima, all of Hitachi, Japan; Tokuji Iijima, deceased, late of Hitachi, Japan, by Yoshie Iijima, administratrix

[73] Assignee: Hitachi, Ltd., Japan

[21] Appl. No.: 355,272

[22] Filed: Apr. 27, 1973

[30] Foreign Application Priority Data

May 8, 1972  Japan ............................. 47-45209/72

[51] Int. Cl.$^2$ ............................................. C01B 17/00
[52] U.S. Cl. ........................................ 423/242; 55/73
[58] Field of Search ............... 423/242, 512, 554, 555; 55/68, 73

[56] References Cited

U.S. PATENT DOCUMENTS

| | | | |
|---|---|---|---|
| 2,021,936 | 11/1935 | Johnstone | 423/242 |
| 3,389,829 | 6/1968 | Stanford | 423/242 |
| 3,781,407 | 12/1973 | Kamijo et al. | 423/242 |
| 3,899,099 | 8/1975 | Oiestad | 55/37 |
| 3,929,434 | 12/1975 | Nelson | 55/68 |

OTHER PUBLICATIONS

Treatment of Sulfur Fumes in Connection with the Working of the Proposed Electric Power Station of the London Power Company at Battersea, 1929, British Minister of Transport.

*Primary Examiner*—O. R. Vertiz
*Assistant Examiner*—Eugene T. Wheelock
*Attorney, Agent, or Firm*—Craig & Antonelli

[57] ABSTRACT

A waste flue gas desulfurizing method in which a waste flue gas containing sulfurous acid gas is contacted directly with sea-water, whereby the sulfurous acid gas is absorbed in the sea-water and concurrently sulfites are formed in the sea-water by the reaction between the sulfurous acid ions and metal ions present in the sea-water, and then the carbonic acid component contained in the sea-water which is then in the acidic region is released therefrom by a decarbonation operation to restore the pH value of the sea-water in the neutral region, and thereafter oxygen contained in air or from other source is introduced into the sulfite-containing sea-water to convert said sulfites into sulfates.

20 Claims, 9 Drawing Figures

WASTE FLUE GAS DESULFURIZING METHOD

BACKGROUND OF THE INVENTION

This invention relates to a method of removing sulfurous acid gas from smokes discharged from a variety of combustion facilities such as generating power plants.

The disposal of toxic substances, especially sulfurous acid gas, in the smokes discharged from a variety of combustion facilities is a serious problem in the regulation of environmental pollution, and strenuous studies are being made and accessory purification facilities are being constructed at huge expenditures, by electric power companies and chemical companies.

The toxic substance removing methods presently being employed are classified broadly into a dry process using active carbon or manganese as absorbent, and a wet process using liquid slaked lime, caustic soda or aqueous ammonia as absorbent. The dry process is inferior to the wet process in respect of desulfurization ratio, the desulfurization ratio of the former being 70 - 80%, and suffers from the disadvantages that the regeneration of the manganese powder or active carbon is difficult and that the useful life of the active carbon is short or the scattering manganese powder causes the secondary environmental pollution. The wet process is advantageous in that the desulfurization ratio is higher than 90% but has the disadvantage that it lowers the smoke temperature. Further, either process involves chemically complex operations in the effective utilization of the huge amounts of by-products or in the disposal of the same in the form of non-toxic substances, and poses many problems yet to be solved when it is practiced in the actual waste flue gas treating apparatus.

In the past, the use of the dry process has been predominant in the treatment of waste flue gases for the reason that it does not lower the waste flue gas temperature and, therefore, an air pollution preventing effect can be expected by the diffusion of the gas from a chimney. However, with the amount of waste flue gas increasing more and more, the concentration of gas released in a fixed zone has increased and it appears that the effect of diffusion of the gas has reached its peak. Under such circumstances, it is the recent trend to remove the sulfurous acid gas from the smoke as much as possible. Further, in the conventional wet process the transportation of large amounts of chemical materials used as neutralizing agents and large amounts of by-products, the effective utilization of the by-products and the conversion of the by-products into non-toxic substances, have been big problems yet to be solved.

SUMMARY OF THE INVENTION

The present invention has been achieved in view of these disadvantages of the conventional processes. Namely, the present invention has for its object to provide a method of removing sulfurous acid gas by the wet purification process using sea-water available in abundance in the vicinity of a generating power plant, without using chemical adsorbents or absorbents at all. Sea-water is alkaline and itself is capable of absorbing and removing sulfurous acid gas efficiently.

According to the present invention there is provided a waste flue gas desulfurizing method comprising contacting a sulfurous acid gas-containing waste flue gas directly with sea-water thereby to cause the sulfurous acid gas to be absorbed in the sea-water and concurrently to form sulfites by the reaction between the sulfurous acid ions and the metal ions present in said sea-water, releasing carbonic acid component from said sea-water which is then in the acidic region by a decarbonation operation to restore the pH value of said sea-water in the neutral region, and introducing oxygen contained in air or from other source into said sulfite-containing sea-water to convert said sulfites into sulfates.

The typical chemical composition of sea-water is shown in Table 1 given below:

Table 1

| Chemical composition of sea-water | | | |
|---|---|---|---|
| pH value | 8.2 – 8.3 | | |
| Alkalinity as a whole | 2.2 mg - eg/l | | |
| | Cation | Concentration ppm | Anion | Concentration ppm |
| Composition | $Na^+$ | 10556 | $Cl^-$ | 18930 |
| | $Mg^{++}$ | 1272 | $SO_4^{--}$ | 2649 |
| | $Ca^{++}$ | 400 | $HCO_3^-$ | 140 |
| | $K^+$ | 380 | $Br^-$ | 65 |
| | $SR^{++}$ | 13 | $F^-$ | 1 |
| | | | $H_2BO_3^-$ | 26 |
| | Fe, Mn, Co, Ni, Cu, Cr, V and Tr which have catalytic effects. | | | |

The major ions which have influence on the total alkalinity of sea-water are $HCO_3^-$, $CO_3^{--}$, $H_2BO_3^-$, $OH^-$ and $H^+$, and the value obtained by subtracting $H^+$ from these ions is called total alkalinity, which value is 2.2 mg-eq/l. Therefore, if the amount of sulfurous acid gas absorbed in sea-water is less than the equivalent to the total alkalinity, the alkalinity of the sea-water can be maintained due to the self-restoration of pH value even when the sea-water absorbs sulfurous acid gas. Namely, the pH value of the sea-water which is in the acidic region with sulfurous acid gas absorbed therein can be restored in the neutral region by reacting the sulfurous acid gas with the carbonic acid radicals (mainly $HCO_3^-$) or the so-called decarbonation operation. The sulfurous acid gas absorbed in the sea-water reacts with the metal ions (mainly $Ca^{++}$, $Mg^{++}$) present in the sea-water and exists in the form of sulfites. These sulfites are active and impose detrimental effects on the livings in the sea by decreasing the oxygen dissolved in the sea. For rendering the sulfites harmless, they are oxidized into chemically stable sulfates by introducing air (oxygen) into the sea-water. The sea-water thus treated can be returned to the sea as harmless water or can be reused as feedwater for a plant for making fresh water from sea-water.

The advantages of the present invention are summarized as follows:

(1) The desulfurization ratio can be increased above 95% by the mutual actions of the ions present in sea-water.

(2) The desulfurization of waste flue gases and removal of the harmful substances from the discharged sea-water can be achieved by a simple process which can be operated and controlled with ease.

(3) The transportation of chemical materials, the operation for the effective utilization of by-products and the complex procedures before the disposal of the by-products can be eliminated which have been necessary in the conventional processes.

(4) When the present invention is applied to generating power plants, the cost of treatment can be drastically reduced and the treating apparatus can be provided in a small compact form, by utilizing the cooling water (sea-water) from the condenser in the treatment according to the invention. Further, when the sea-water is fed in the decarbonated state to an apparatus for making fresh water from sea-water, a part of the operational steps in the apparatus can be eliminated.

(5) The sea-water to be discarded from an apparatus for practicing the invention contains only about 3% more sulfates dissolved therein than in the normal sea-water, which are chemically stable and present no fear of decreasing the dissolved oxygen in sea-water and give no detrimental affects on the livings upon depositing on the sea bottom. The increase of the sea-water temperature caused by the discarded sea-water is very slight and the so-called thermal pollution can be avoided.

DESCRIPTION OF THE PREFERRED EMBODIMENTS

First of all, the principle of the invention will be described by way of chemical formulae in the order of treating steps. For the convenience of description, reference is made to $HCO_3^-$ as alkali ion which occupies the major portion of the alkali ions, and to $Ca^{++}$ as metal ion of the sulfites.

The chemical formulae of the reactions concerning these ions are shown step by step as follows:

$$SO_2 + H_2O = H_2SO_3 \qquad (1)$$

$$Ca(HCO_3)_2 + H_2SO_3 = CaSO_3 = 2H_2CO_3 \qquad (2)$$

$$CaSO_3 + \tfrac{1}{2}O_2 = CaSO_4 \qquad (3)$$

$$H_2CO_3 = H_2O + CO_2 \qquad (4)$$

In the absorbing step, first of all, sulfurous acid gas ($SO_2$) absorbed in sea-water is converted into $H_2SO_3$ according to formula (1) and the pH value of the sea water moves into the acidic region. In this case, $CaSO_3$ is concurrently formed according to formula (2). This $CaSO_3$ is oxidized by the oxygen present in a waste flue gas and the oxygen dissolved in the sea-water, and is partially converted into $CaSO_4$. The major portion of the unreacted $CaSO_3$ are oxidized entirely into $CaSO_4$ in the following step in a unit in which the sea-water is contacted with air for the self restoration of pH (see formula (3)). In the pH self-restoration step which takes place concurrently with the oxidation reaction, the reaction represented by formula (4) proceeds and the pH of the sea-water is self-restored.

The rate of the $CaSO_3$ oxidation reaction is generally low and, in the conventional desulfurizing process using milk of lime, the oxidation of the formed $CaSO_3$ has been a serious problem. In the present invention, however, the oxidation reaction occurs relatively easily, owing to the facts that the concentration of $CaSO_3$ is low and the $CaSO_3$ is dissolved in the sea-water, and that metal ions such as Fe, Mn, Co, Ni, Cu, Cr, V and Ti having catalytic activities are present in the sea-water. $H_2CO_3$ due to formula (4) is chemically unstable in the acidic region and can be easily released when air is introduced. The pH self-restoration and oxidation reactions proceed partially in the aforesaid absorbing step, but since carbonic acid gas is contained in the waste flue gas at a concentration about 400 times as high as that in air, the decarbonation proceeds only little in the process of desulfurization (see formula (1)) in the relation of equilibrium values. Therefore, by introducing air for the pH self-restoration and oxidation, the reaction of formula (4) proceeds quickly, releasing carbon dioxide gas ($CO_2$) and thus the pH value of the sea water can be restored in the neutral region from the acidic region.

Figure 1:
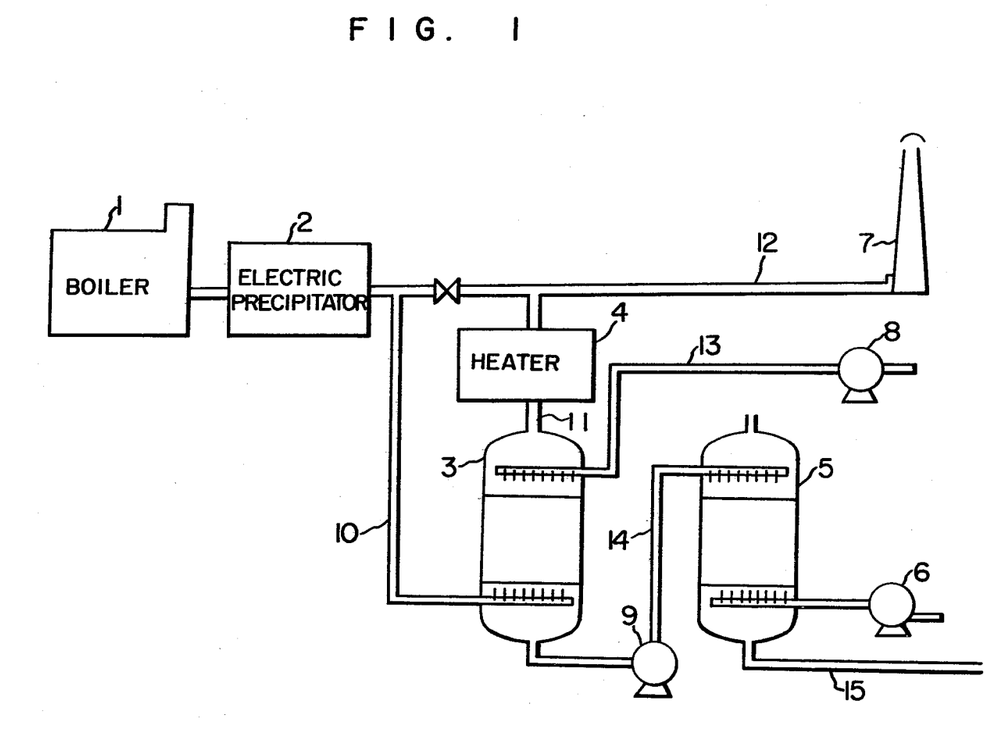
FIG. 1 is a process diagram of the method of this invention.

A practical process of the invention will now be described. FIG. 1 is a process diagram of an apparatus for practicing the invention. First of all, the waste flue gas from a boiler 1 is passed in an electric precipitator 2 for removing dusts or other solids therefrom. The gas leaving the electric precipitator 2 is generally composed of 10 – 15 vol % of $CO_2$, 10 vol % of $H_2O$, 0.1 – 0.3 vol % of $SO_2$, 5 vol % of $O_2$ and 70 – 75 vol % of $N_2$, and its temperature is 130° C. This gas is led into an absorbing tower 3 via a conduit 10. In the absorbing tower 3, the gas is contacted by sea-water supplied to the top of the tower via a conduit 13 by pump 8 and passing downwardly in said tower, and the sulfurous acid gas is removed from the gas by being absorbed in said sea-water. In this case, the concentration of sulfurous acid gas is about 1/100 of that of carbon dioxide gas, but the solubility of sulfurous acid gas in the sea-water is about twice as high as that of carbon dioxide, and the reaction of the dissolved sulfurous acid gas proceeds faster and more stably than that of dissolved carbon dioxide. Therefore, the sulfurous acid gas is removed from the gas substantially completely in the absorbing tower 3 and in this case carbon dioxide gas is also partially dissolved in the sea-water, with the result that the pH value of the sea-water is lowered. The sea-water of lowered pH is led from the absorbing tower through a pump 9 and a conduit 14 into a decarbonation oxidation tower 5 in the next step. On the other hand, the waste flue gas treated in the absorbing tower 3 and containing a less amount of sulfurous acid gas is passed in a conduit 11 and a heater 4 and released into the atmosphere from a chimney 7. The heater 4 may be an air-preheating type heat exchanger commonly used in boilers. In the decarbonation-oxidation tower 5, the carbon dioxide gas dissolved in the sea-water supplied from the absorbing tower 3 is removed therefrom by the decarbonation reaction with air having a low carbon dioxide gas partial pressure and supplied to the bottom of the tower from a blower 6, and the removed carbon dioxide gas is released into the atmosphere. The carbonic acid radicals dissolved in the sea-water are removed therefrom by the decarbonation reaction and the pH value of the sea-water is restored in the neutral region. The sulfites are partially converted into sulfates concurrently with the absorption in the absorbing tower 3 and the decarboxylation reaction. The sulfites will cause sea-pollution by reducing the dissolved oxygen in sea-water as stated previously, if they are discharged directly into the sea, and therefore, it is necessary to convert the sulfites into chemically stable and harmless sulfates. Advantageously, the oxidation of the sulfites proceeds rapidly smoothly in the decarbonation-oxidation tower as a large amount of air is used in said tower, and the tower serves as an oxidation tower. The harmless seawater leaving from the decarbonation-oxidation tower is returned to the sea via a line 15. The present invention will be further described by way of examples hereunder in which are illustrated the results of experiments conducted to materialize such practical process as described above.

EXAMPLE 1

Figure 2:
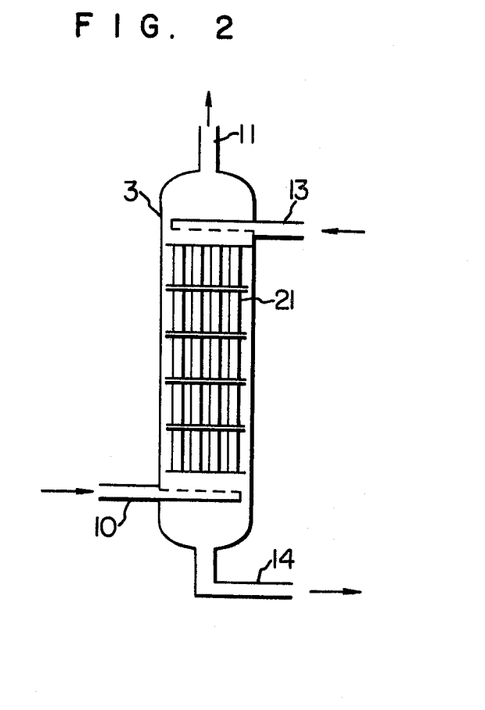
FIG. 2 is a sectional view of an absorbing tower in one embodiment of the invention.
Figure 3:
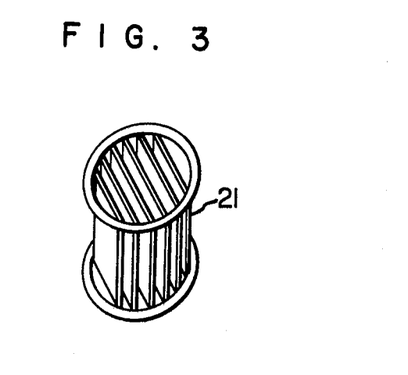
FIG. 3 is a perspective view of the filler in the absorbing tower.

The basic experiment conducted for practically operating the method of this invention will be described hereunder. For treating a large volume of waste flue gas, it is advantageous to use packed towers of small pressure loss for the absorbing tower and decarbonation-oxidation tower, and therefore, the vertical flat plate type packed tower shown in FIG. 2 was used in the experiment. The vertical flat plate type filler 21 shown in FIG. 3 is composed of a plurality of 10 mm thick wooden plates arranged in side by side parallel relation at an interval of 1 inch. The diameter of the filler 21 is 195 mm and the height thereof is 200 mm. The filler 21 of the construction described above was disposed in the tower 3 having an inner diameter of 200 mm and a height of 2000 mm to perform an absorption test. Sea-water was supplied from a conduit 13 and a waste flue gas was supplied from a conduit 10 connected to the bottom of the tower. The sulfurous acid gas contained in the waste flue gas was absorbed in the sea-water by contact therewith between the adjacent vertical flat plates of the filler, and the treated gas was discharged from a conduit 11. On the other hand, the sea-water with sulfurous acid gas absorbed therein was withdrawn to the outside of the system from a conduit 14. The packed tower used for the decarbonation-oxidation tower was of the same dimensions as the above-described absorbing tower, and air was supplied to the tower from the conduit 10 and the sulfurous acid gas-containing sea-water from the preceding step was supplied from the conduit 13.

Figure 4:
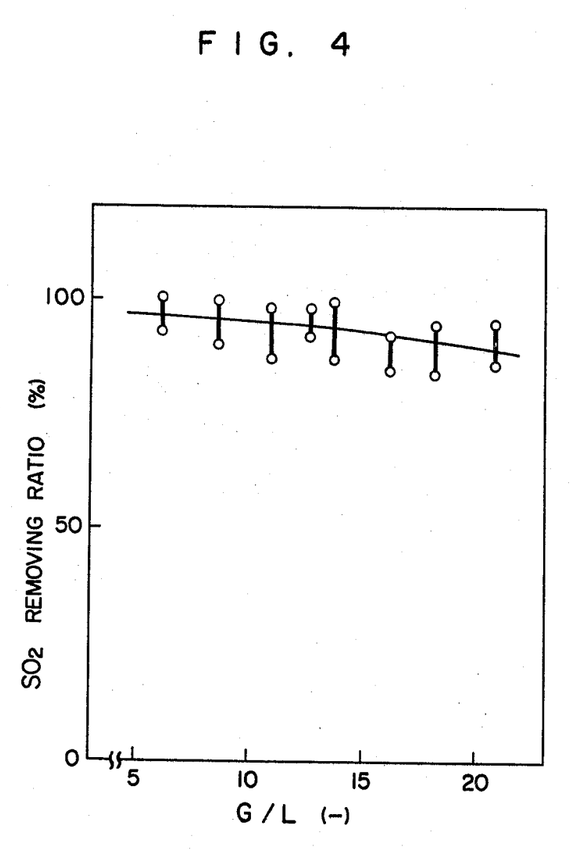
FIG. 4 is a diagram showing the sulfrous acid gas removing ratio in the absorbing tower shown in FIG. 2.
Figure 5:
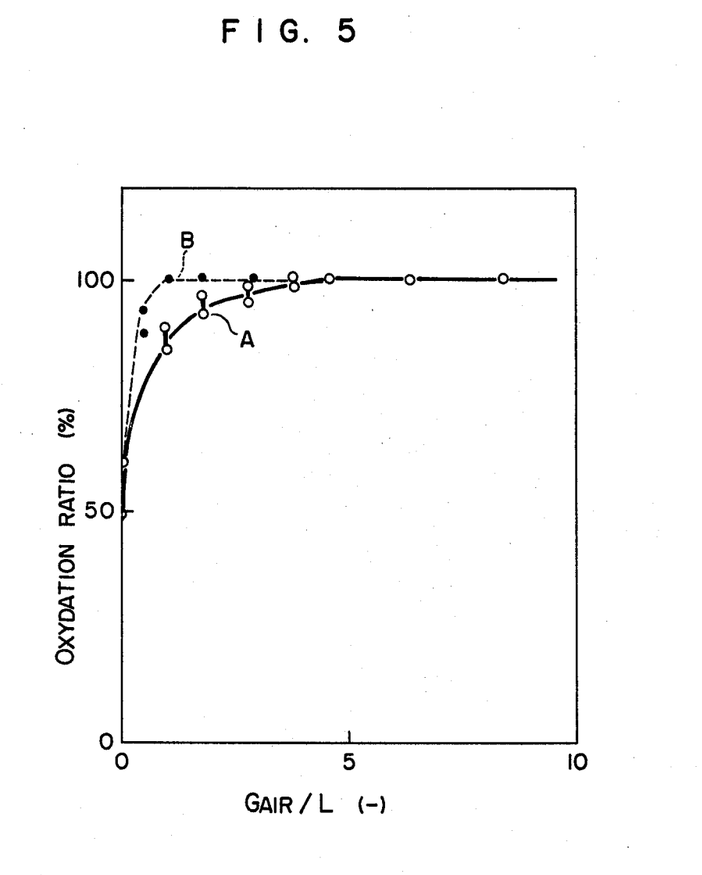
FIG. 5 is a diagram showing the oxidation ratio in the absorbing tower.
Figure 6:
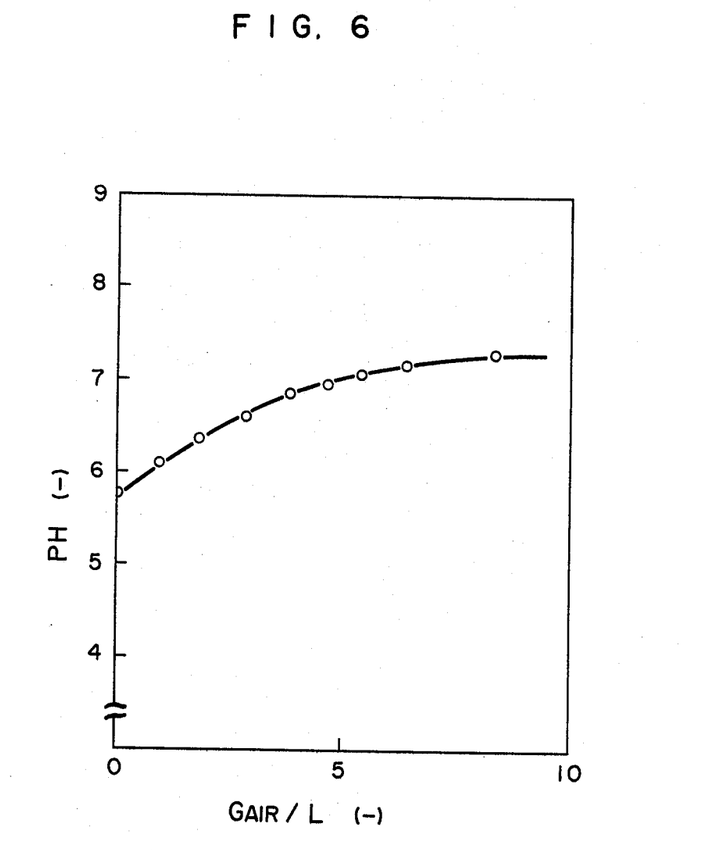
FIG. 6 is a diagram showing the pH value in the absorbing tower.

The results of these experiments are shown in FIGS. 4 to 6. FIG. 4 shows the efficiency of absorption, FIG. 5 the oxidation ratio and FIG. 6 the efficiency of decarbonation or the restoration of pH. The diagram of FIG. 4 was obtained when sea-water was passed in the absorbing tower at the rate of 60 t/m$^2$.h to treat a waste flue gas containing 0.2 vol % of sulfurous acid gas and 10 vol % of carbon dioxide gas, and shows the sulfurous acid gas removing ratio, using as parameter $G/L$, that is, the ratio of the gas supply rate $G$ (Nm$^3$/h) to the sea-water supply rate $L$ (m$^3$/h). In this case, the $G/L$ value for achieving the self-restoration of pH value in the next step, which is obtained from the total alkali equivalent in the sea-water, is at the point of 12.9 and the removing ratio at this point is about 95 %. The gas treating rate is 24 m$^3$/h and superficial velocity in the tower is 0.22 m/S in this case. It will be seen that increasing the gas supply rate to make the $G/L$ value larger than 12.9 results in only a slight decrease of the sulfurous acid gas removing ratio, indicating the excellent sulfurous acid gas removing property of the sea-water. The sea-water used under the condition of $G/L = 12.9$, i.e., the sea-water containing about 1.1 m-mol/l of sulfurous acid gas absorbed therein was supplied to the next step at the rate of 60 t/m$^2$.h and processed with air. The state of restoration of the pH value of the sea-water and the oxidation ratio of the sulfites, in this case, are respectively shown in FIGS. 5 and 6, using as parameter $Gair/L$, that is, the ratio of the air supply rate $Gair$ (Nm$^3$/h) to the sea-water supply rate $L$ (m$^3$/h). As shown in FIG. 5, the sulfite oxidation ratio reaches 100 % in the neighborhood of $Gair/L = 4.5$ on the curve A which is for normal temperature and in the neighborhood of $Gair/L = 1.0$ on the curve B which is for the liquid temperature which is 40° C. Thus, the oxidation ratio is influenced largely by the liquid temperature. On the other hand, the pH value of the sea-water is self-restored in the neutral region at the point of $Gair/L = 6$.

The desulfurizing efficiency of the method of this invention will be calculated based on these data, with reference to the case when the method is applied to a generating power plant by the arrangement according to FIG. 1. For instance, let it be supposed that the rate of discharge of the exhaust gas from a 175 MW heavy oil boiler is 533,000 Nm$^3$/h, the sulfurous acid concentration in the exhaust gas is 0.2 vol %, and the gas temperature is 130° C. The amount of sea-water necessary for absorbing the sulfurous acid gas and for enabling the self-restoration of pH value upon decarbonation, as calculated based on the total alkalinity in the sea-water being 2.2 mg-eq/l, is at least 41,200 t/h. The exhaust gas treated in the absorbing tower has a sulfurous acid gas concentration less than 100 ppm and a temperature of 25° C., and is heated to about 60° C. in the heater 4 as in the conventional wet process, and then released into the atmosphere from the chimney 7. In this case, the amount of kerosene need to be supplied to the heater is about 0.6 t/h. The sea-water having the sulfurous acid gas absorbed therein and at a temperature of 20.4° C. is supplied to the decarbonation-oxidation tower 5 from the absorbing tower. In the decarbonation-oxidation step, air is supplied in the tower from the bottom thereof at the rate of $Gair/L = 6.0$, i.e., at the rate of 250,000 Nm$^3$/h, to achieve decarbonation and oxidation concurrently. The sea-water leaving from the decarbonation-oxidation tower, which has been rendered harmless by such process, is discharged to the sea.

The method of the invention is a simple desulfurizing process which does not require chemical materials as required in the lime process or ammonia process. However, the method requires more electricity than required by the conventional processes, for operating the pump for feeding a large amount of sea-water and for operating the blower for feeding air used for decarbonation, and therefore, incurs a greater electric charge. By using the cooling water from the condenser in the generating power plant, the amount of sea-water for desulfurization, which is taken from the sea, can be reduced to about the half of that otherwise required, and accordingly the electric charge incurred by the pump which occupies the major portion of the total electric charge, can be decreased to about the half, which is very economical. The use of the cooling water from the condenser is also advantageous in that, since the sea-water in the decarbonation-oxidation tower rises in temperature, the decarbonation efficiency can be enhanced and the apparatus can be reduced in size. Consequently, the utility of the apparatus becomes essentially the same as that in the conventional processes. On the other hand, the facility cost is smaller for the method of the invention than for the conventional processes, as the method of this invention does not call for facilities for pulverization and transportation of lime and for calcination of gypsum produced as by-product, which are called for by the conventional processes. Thus, according to the invention, the by-product processing facility cost and personal expenditure can be drastically reduced.

EXAMPLE 2

Figure 7:
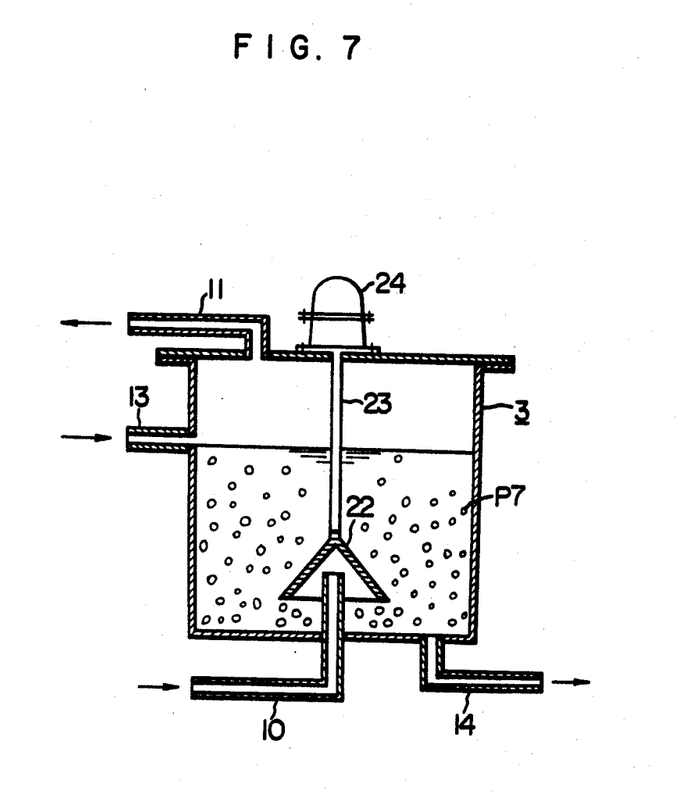
FIG. 7 is a sectional view in another embodiment of the invention.
Figure 8:
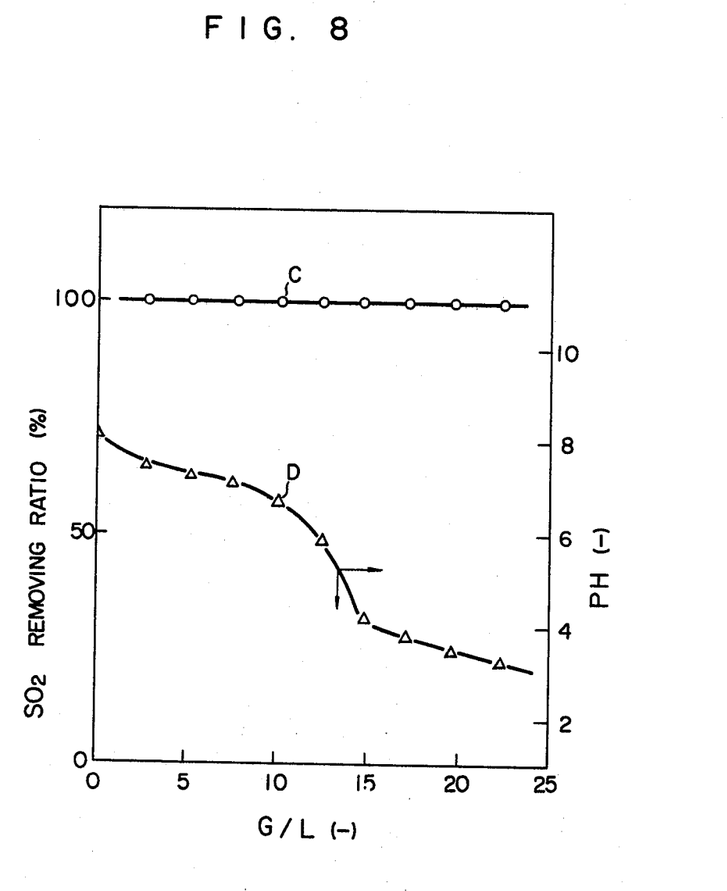
FIG. 8 is a diagram showing the sulfurous acid gas removing ratio and pH value in the absorbing tower shown in FIG. 7.
Figure 9:
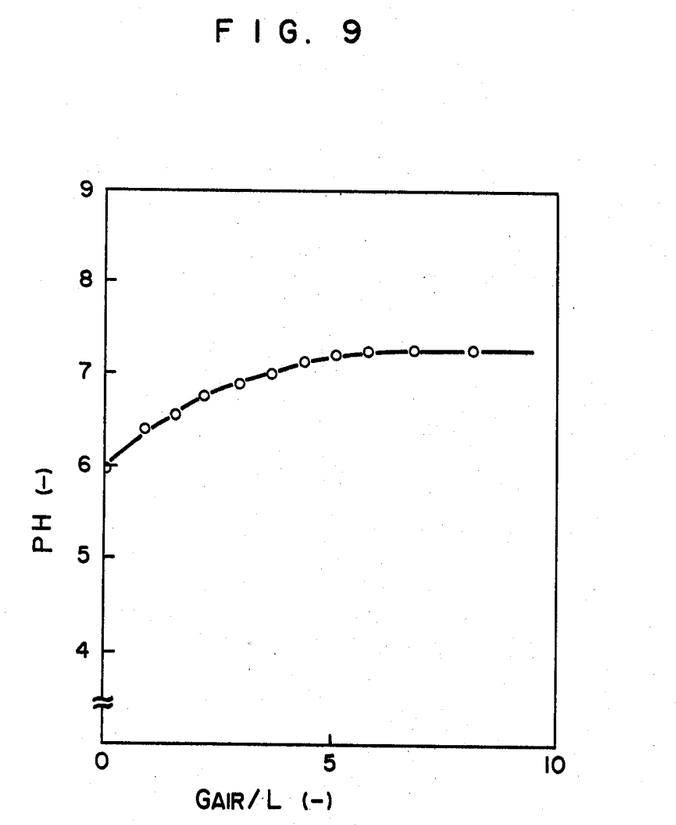
FIG. 9 is a diagram showing the pH value in the absorbing tower of FIG. 7.

In Example 1, the method of the invention was practiced with the packed tower having the vertical flat plate type filler therein, for the desulfurization of the waste flue gas from a generating power plant, but in this Example the method of the invention is operated with a reactor having an umbrella type rotor (described in Japanese patent application No. 4261/72) therein, which provides for more efficient gas-liquid contact, as an apparatus for the desulfurization of the waste flue gas from a small boiler. The apparatus used for practicing the method of the invention is shown in FIG. 7, which includes a reaction tank 3 having an inner diameter of 300 mm and an umbrella type rotor 22 disposed therein. An absorption test was conducted by rotating the umbrella type rotor 22 at the peripheral speed of 10 m/s, feeding a waste flue gas containing 0.2 vol % of sulfurous acid gas from a gas inlet conduit 10 at the rate of 10 m$^3$/h and supplying sea-water from a liquid inlet conduit 13, and the relation between the sulfurous acid gas removing ratio and $G/L$ was determined, with the result shown in FIG. 8 by the line C. As seen, in this experiment, the sulfurous acid gas removing ratio was 100% or, in other words, the sulfurous acid gas in the waste flue gas was completely removed. This is attributable to the fact that fine air bubbles are formed and distributed uniformly in the liquid in the reaction tank 3 by the rotating umbrella type rotor 22, which enhance remarkably the liquid-gas contacting efficiency. The curve D in FIG. 8 shows the pH value of the used sea-water emerging from the reaction tank 3 through a liquid discharge conduit 14. It will be seen that the pH value becomes small slowly as the $G/L$ increases and becomes small abruptly at about $G/L = 13$. This $G/L$ value well matches with the $G/L$ value of 12.9 which is in equivalent relation with the total alkali in the sea-water as stated previously, indicating that the sulfurous acid gas in the waste flue gas has completely been absorbed in the sea-water. On the other hand, the sulfurous acid gas thus absorbed in the sea-water forms sulfites which must be oxidized into sulfates before the used sea-water is discharged to the sea. In this apparatus, because of the extremely high liquid-gas contacting efficiency, the oxidation of the sulfites proceeds concurrently with the absorption of sulfurous acid gas and the sulfites are completely oxidized, the oxidation ratio being 100%. Separately from the above testing, the sea-water treated under the condition of $G/L = 12.9$ was fed in a reactor similar to that described above and air was introduced therein to restore the pH of the sea-water by decarbonation. The relation between the pH value and $Gair/L$ obtained from this testing is shown in FIG. 9. It will be seen that the pH value is restored in the neutral region (pH = 7) at $Gair/L = 3.5$. Thus, it will be understood that the desulfurization of waste flue gases by sea-water can also be achieved with high efficiency by use of a reactor having an umbrella type rotor therein.

The method of this invention is free of sea pollution for the following reasons which have been acknowledged by the experiments illustrated in Examples 1 and 2 given above:

Firstly, the chemically stable sulfates (such as CaSO$_4$) which are originally present in the sea-water in the form of sulfate ion (SO$_4^{--}$) in an amount of about 2650 ppm, increases about 100 ppm in the sea-water used in the method of the invention as absorbent to about 2750 ppm but are present in the use sea-water still in the form of solutions and do not deposit on the sea bottom as do the sulfates resulting from the conventional processes. Therefore, these sulfates do not have any detrimental affect on the livings in the sea.

Secondly, the method of this invention does not diminish the useful components of the sea-water, such as Fe, PO$_4^{---}$, NO$_3^-$, NO$_2^-$, SiO$_3^{--}$, Ca, Si and NH$_4^+$, which are necessary for the lives of the livings in the sea. In operating the method of this invention some amount of HCO$_3^-$ present in the sea-water is consumed (see formula (2)) but this component is not useful for the sea livings and gradually replenished per se, by the providence of nature.

We claim:

1. A method of desulfurizing waste flue gases, comprising contacting waste flue gas containing sulfurous acid gas directly with sea-water containing metal ions and HCO$_3^-$ thereby absorbing the sulfurous acid gas in the sea-water and concurrently forming metal sulfites in the sea-water by the reaction between sulfite ions formed during said absorption and metal ions present in the sea-water, contacting the metal sulfite containing sea-water with an oxygen containing gas to effect decarbonation of said sea-water which is then in the acidic region thereby to restore the pH value of the sea-water to the neutral region, said contacting of the sea-water with the oxygen containing gas also serving to convert the sulfites into sulfates, and said sea-water being in an amount such that the quantity of the sulfurous acid gas absorbed in the sea-water is substantially less than the total alkaline equivalent of said sea-water.

2. A method of desulfurizing waste flue gases, as claimed in claim 1, wherein air is used as an oxygen supply source for converting the sulfits in the sea-water into sulfates.

3. A method of desulfurizing waste flue gases, as claimed in claim 1, wherein the metal ions to form said sulfites and sulfates are calcium ions C$^{++}$.

4. A method of desulfurizing waste flue gases, as claimed in claim 1, wherein the metal ions to form said sulfites and sulfates are magnesium ions Mg$^{++}$.

5. A method of desulfurizing waste flue gases, as claimed in claim 1, wherein said decarbonation operation and oxidation of the sulfites are effected concurrently by making use of the oxygen contained in air introduced into the sea-water.

6. The method of claim 1, wherein the ratio of the supplied quantity of said waste flue gas to the supplied quantity of said sea-water is about 13.

7. A method for desulfurizing waste flue gases containing sulfurous acid gas comprising:
  contacting the waste flue gas with raw sea-water to absorb the sulfurous acid gas in the sea-water and to yield sulfite-containing, acidic sea-water, wherein the quantity of sulfurous acid gas absorbed in the sea-water is maintained substantially less than the equivalent to the total alkalinity of the sea-water, and then contacting the sulfite-containing, acidic sea-water with an oxygen containing gas to restore the pH value thereof to a neutral region and to convert sulfites contained therein to sulfates, whereby the sea-water is rendered substantially harmless.

8. The method of claim 7, wherein the sea-water is returned to the sea in a condition substantially harmless to the living in the sea.

9. The method of claim 1, wherein a first ratio of the quantity of waste flue gas to the quantity of sea-water contacted with each other, and a second ratio of the supplied quantity of oxygen containing gas to the quantity of sea-water supplied are so adjusted that the sulfite oxidation ratio is substantially 100%.

10. The method of claim 1, wherein a first portion of the raw sea-water is obtained directly from the sea and a second portion of the sea-water is obtained from cooling water of a condenser in a generating power plant, such that the efficiency of decarbonation of the sea-water is enhanced.

11. The method of claim 1, wherein the waste flue gas is contacted with the sea-water by injecting the gas under a rotating umbrella-type rotor which is submerged in a body of the sea-water.

12. The method of claim 11, wherein the sulfite-containing sea-water is contacted with oxygen containing gas by injecting the oxygen containing gas under a rotating umbrella-type rotor which is submerged in a body of the sulfite-containing sea-water.

13. The method of claim 12, wherein the decarbonation and oxidation are effected concurrently by introducing air into the sulfite-containing, acid sea-water.

14. The method of claim 1, wherein the oxygen containing gas is air.

15. The method of claim 14, wherein the air is provided for contact with the metal sulfite containing sea-water after the absorbing step.

16. The method of claim 1, wherein the absorbing step is performed in an absorbing tower, and wherein the decarbonation step and converting of sulfites to sulfates step are performed in a separate decarbonation-oxidation tower.

17. The method of claim 7, wherein the raw sea-water contains metal ions and $HCO_3^-$.

18. The method of claim 17, wherein the metal ions are at least one member selected from the group consisting of $Na^+$, $Mg^{++}$, $Ca^{++}$, $K^+$ and $Sr^{++}$.

19. The method of claim 17, wherein the raw sea-water also contains at least one anion selected from the group consisting of $Cl^-$, $SO_4^{--}$, $Br^{31}$, $F^-$ and $H_2BO_3^-$.

20. The method of claim 19, wherein the raw sea-water has a pH value of about 8.2 – 8.3.

* * * * *